Patented Feb. 4, 1947

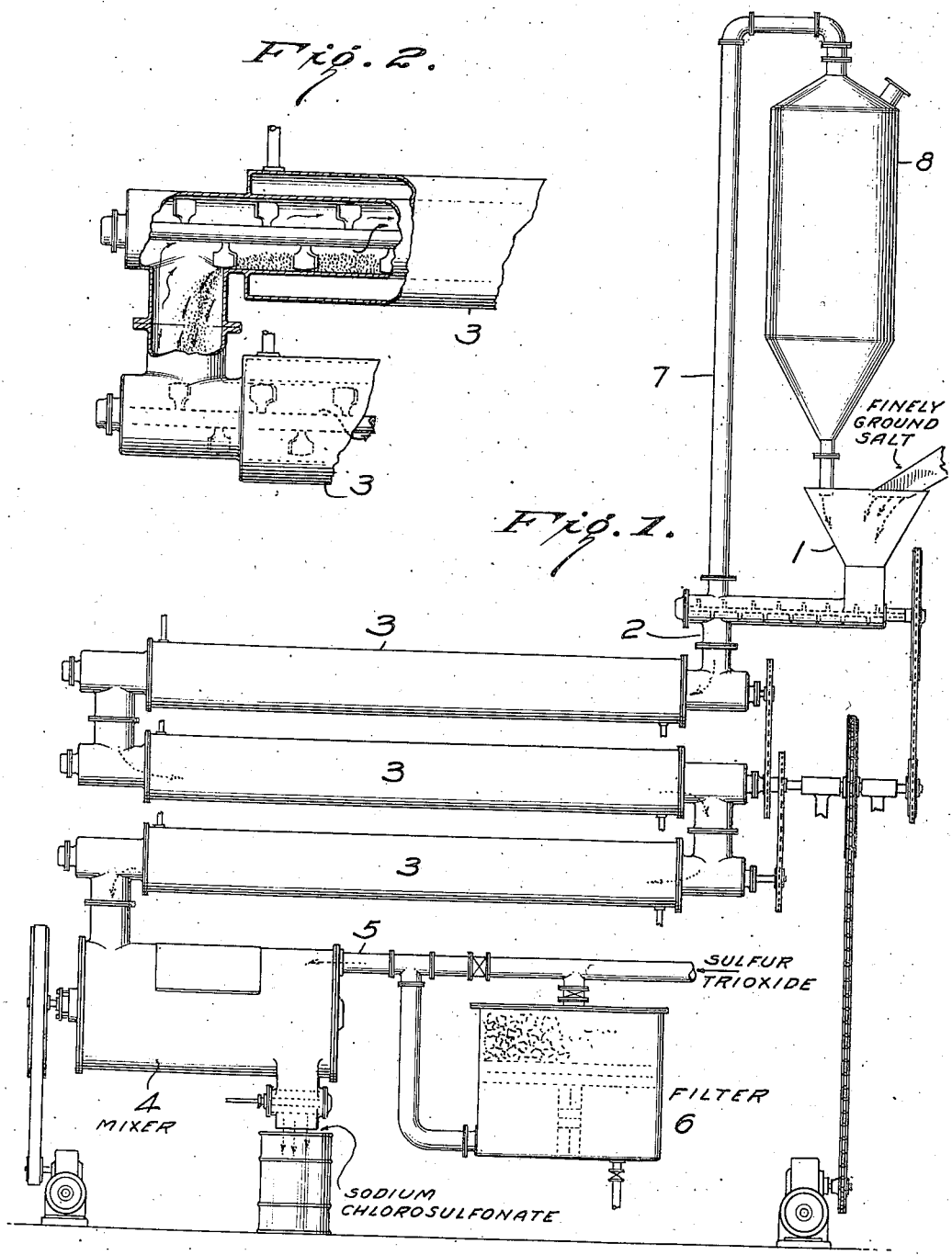

2,415,358

UNITED STATES PATENT OFFICE 2,415,358

PREPARATION OF ALKALI METAL CHLOROSULFONATES

Napoleon Arthur Laury, Bound Brook, N. J., assignor to American Cyanamid Company, New York, N. Y., a corporation of Maine Application October 21, 1941, Serial No. 415,943

4 Claims. (Cl. 23—121)

This invention relates to an improved process for preparing alkali metal chlorosulfonates, and, in particular, to a continuous process for preparing sodium chlorosulfonate.

Known methods for preparing sodium chlorosulfonate involve the reaction of sodium chloride with sulfur trioxide, but these methods do not provide for such a continuous production as do the process and apparatus of this invention.

The contacting of the relatively large particles of a chloride, such as sodium chloride, with sulfur trioxide results in an incomplete reaction as only the surface of the particle is contacted and reacted. The inside of the salt particle remains unconverted and the result is an inferior yield of the sodium chlorosulfonate based on the material used. In order to overcome this difficulty and increase the contacting surface it has been proposed to prepare chlorosulfonates by grinding sodium chloride while reacting it with sulfur trioxide. This, however, has the disadvantage of necessitating the use of complicated equipment, such as a ball mill, of special gas-tight design which presents difficulties of operation and maintenance. There is also the disadvantage of grinding the finished product along with the unreacted salt, resulting in the possible excessive grinding of the product, which would cause some of it to dust.

According to the present invention, I have found that, contrary to the teachings of the prior art, it is entirely unnecessary to grind the reaction mixture during the reaction. On the contrary, if the chloride such as sodium chloride is finely ground and is passed through a suitable apparatus in counter current to sulfur trioxide gas, using only such mixing devices as are necessary to stir the finely divided chloride, excellent yields of the chlorosulfonate are obtained.

The process of the present invention eliminates entirely the necessity for elaborate gas-tight grinding equipment which is required by prior processes, with a concomitant saving.

A further advantage of the present invention is that the process can be made completely continuous and thus permits material increases in output from a given size of apparatus in addition to permitting much cheaper equipment.

The chloride used in the present invention should be reduced to a fine particle size before introducing it into the reaction vessel or apparatus. This comminution is effected with standard equipment and presents no corrosion problem nor does it require expensive gas-tight equipment. The exact particle size is not critical. I have found that with sodium chloride 200 mesh material gives excellent results. Finer grinding does not appear to aid materially and is therefore unnecessary. Coarser material can be used over a considerable range without encountering any material losses in yield or contamination of the final product. However, for maximum output a particle size of about 200 mesh is preferred.

This invention is not limited to the apparatus described, as any equipment may be used that can be adapted to the process.

If it is desired to prepare other alkali metal chlorosulfonates by the process of this invention, the corresponding chlorides, such as magnesium, potassium or calcium chlorides can be substituted for sodium chloride.

The invention will be described in greater detail in connection with the drawing in which Figure 1 shows an elevation of a plant (partly in section). The finely ground salt is introduced into the hopper 1, wihch contains rotating fingers to keep the powdered salt flowing, and passes down pipe 2 to three conveyor tubes 3, placed one above the other, through which it is carried by revolving shafts to which have been attached paddles, bolted to the shaft and set at 45 degrees. The best results are obtained when the top conveyor tube is heated to about 50° C. and the lowest one cooled to 60° C. As the salt is conveyed through the tubes it is contacted by the sulfur trioxide gas which gradually converts it to sodium chlorosulfonate which, together with any unreacted salt, passes down to a mixing chamber 4, such as a Day Mixer. In this mixer the sulfur trioxide has been originally introduced at inlet 5 and in this mixer the gas reacts with any unconverted salt. When the product in this mixer is sufficiently high in sulfur trioxide content it is removed as finished sodium chlorosulfonate. The source of sulfur trioxide introduced into the mixer is preferably converter gas from a contact sulfuric acid system and if this source is used the gas is passed through a filter 6, placed at the gas inlet 5, and composed of a layer of a suitable filtering material such as 20–40 mesh coke, which removes any undesirable sulfuric acid fog, present in converter gas. After passing through the conveyor tubes, through which the sodium chloride is being conveyed, the sulfur trioxide passes up pipe 7 to chamber 8 where it continues to contact and react with any particles of salt which have been carried up with the gas. In this chamber the gas is scrubbed by the fine salt and the contents of the chamber are dropped into the feed hopper 1.

I claim:

1. A method for the preparation of an alkali metal chlorosulfonate comprising reacting a finely ground alkali metal chloride, moving in a continuous stream, with contact sulfuric acid converter gas flowing in countercurrent.

2. A method according to claim 1 in which the alkali metal chloride is reduced to an average particle size passing through a 200 mesh sieve.

3. A method for the preparation of sodium chlorosulfonate comprising conveying finely ground sodium chloride continuously against a countercurrent of contact sulfuric acid converter gas, and contacting the unreacted sodium chloride until sodium chlorosulfonate is obtained.

4. A method for the preparation of sodium chlorosulfonate comprising conveying finely ground sodium chloride continuously against a countercurrent of contact sulfuric acid converter gas, contacting the unreacted sodium chloride with fresh sulfur trioxide until the sodium chloride has been changed into sodium chlorosulfonate and scrubbing the sulfur trioxide by the fine salt.

NAPOLEON ARTHUR LAURY.

REFERENCES CITED

The following references are of record in the file of this patent:

UNITED STATES PATENTS

| Number | Name | Date |
|---|---|---|
| 2,254,014 | Laury | Aug. 26, 1941 |
| 2,218,729 | Tauch | Oct. 22, 1940 |
| 1,326,634 | Bergius | Dec. 30, 1919 |
| 663,089 | Naef | Dec. 4, 1900 |
| 1,034,974 | Burkheiser | Aug. 6, 1912 |

FOREIGN PATENTS

| Number | Country | Date |
|---|---|---|
| 3,189 | Great Britain | of 1909 |
| 644,222 | Germany | Apr. 27, 1937 |

OTHER REFERENCES

Traube Article in Ber. 46, pages 2513-2521 (1913).